July 20, 1954 R. M. WILMOTTE 2,684,439

FREQUENCY MODULATION RECEIVER SYSTEM FOR OVERLAPPING WAVES

Filed Dec. 19, 1949 4 Sheets-Sheet 1

INVENTOR
RAYMOND M. WILMOTTE

BY Hyman Hurwitz

ATTORNEY

INVENTOR
RAYMOND M. WILMOTTE

BY Hyman Hurvitz
ATTORNEY

INVENTOR
RAYMOND M. WILMOTTE
BY Hyman Hurwitz
ATTORNEY

INVENTOR
RAYMOND M. WILMOTTE

BY Hyman Hurwitz
ATTORNEY

Patented July 20, 1954 2,684,439

UNITED STATES PATENT OFFICE 2,684,439

FREQUENCY MODULATION RECEIVER SYSTEM FOR OVERLAPPING WAVES

Raymond M. Wilmotte, Washington, D. C., assignor to Padevco, Inc., Washington, D. C., a corporation of Delaware Application December 19, 1949, Serial No. 133,871

5 Claims. (Cl. 250—20)

This invention relates generally to apparatus and methods for the separation of signals overlapping in frequency, and more particularly to methods and apparatus for selectively separating two overlapping frequency modulated carriers.

It is another broad object of the invention to provide novel methods and apparatus for selectively separating two frequency modulated signals, which overlap in frequency, and which are of different amplitudes.

It is another broad aspect of the invention to provide a system for detecting modulation inherent on a first frequency modulated carrier in the presence of another stronger overlapping frequency modulated carrier.

It is another broad object of the present invention to provide circuits for utilizing the beat frequency between two frequency modulated waves in the detection of frequency modulated waves.

It is still another object of the present invention to provide circuits for selectively detecting frequency modulations of two superposed or overlapping carriers in response to signals obtained by suitable sampling of the superposed carriers at selected time intervals.

It is a more specific object of the present invention to provide circuits for demodulating the weaker of two overlapping frequency modulated carriers, without interference from the stronger.

The above and still further objects, features and advantages of the invention will become apparent upon consideration of the following detailed description of specific embodiments thereof, especially when taken in conjunction with the accompanying drawings, wherein.

Suppose two signals, which may be represented, in respect to instantaneous values, by $$E_1=\sin wt \quad E_2=a \sin (w+q)t$$

where $a<1$ and $q$ is the instantaneous difference in the frequencies of the signals, and which may be positive or negative, at random, as time proceeds.

The sum of the two signals is $$(1) \qquad E=E_1+E_2=R \sin (wt+\alpha)$$

where $$(2) \qquad R^2=1+a^2+2a \cos qt$$

and $$(3) \qquad \tan \alpha=\frac{a \sin qt}{1+a \cos qt}$$

Figures 1, 4, 5:
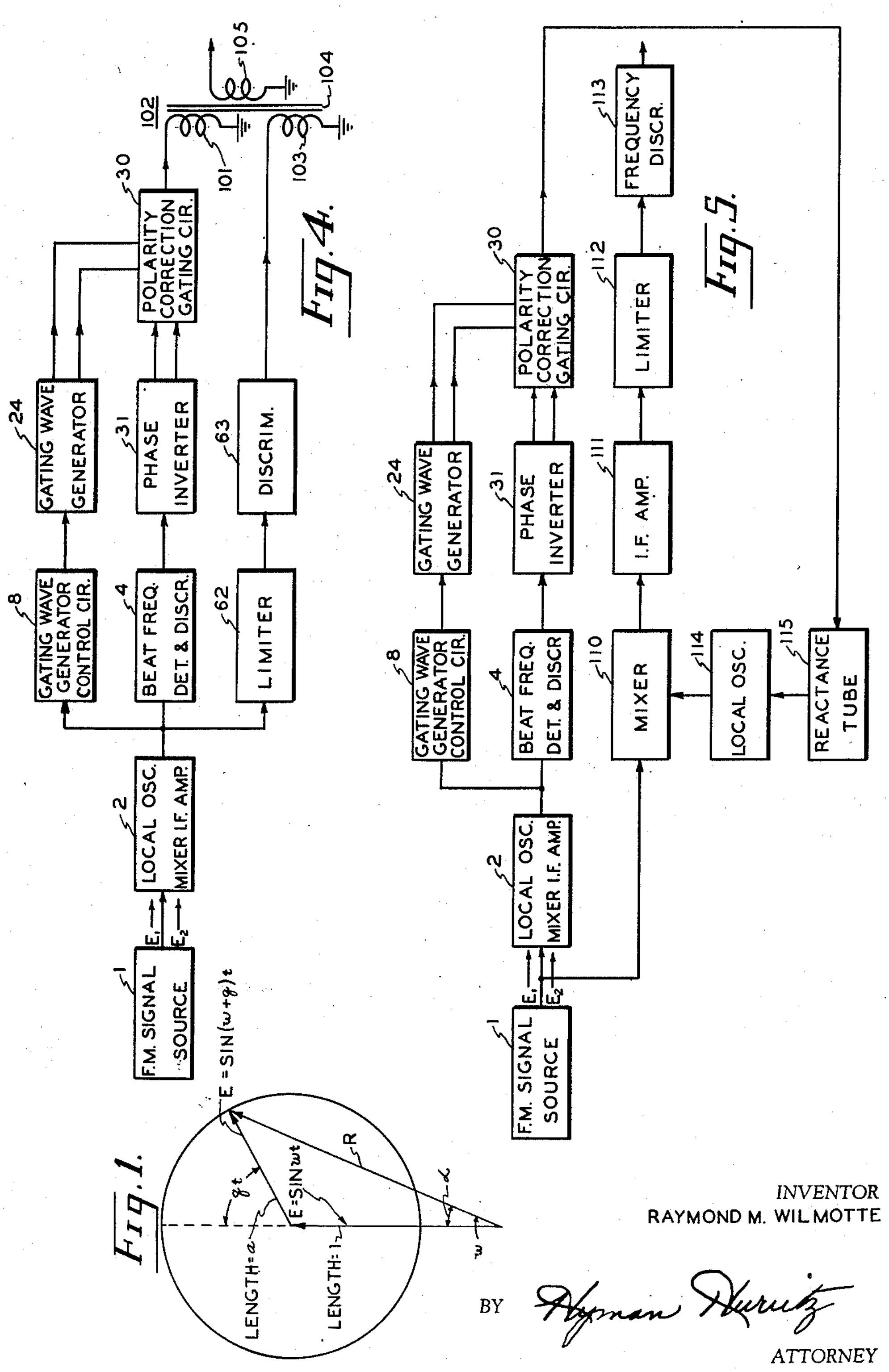
Figure 1 is a vector diagram utilized in clarifying the explanation of the invention.
Figure 4 is a schematic circuit diagram of a modification of the system illustrated in Figure 2 of the drawings.
Figure 5 is a schematic circuit diagram of a modification of the system of Figure 2, in accordance with teaching derived from Figure 3; and, Figure 6 is a further modification of the system of Figure 2.

Referring specifically to Figure 1 of the accompanying drawings, there is illustrated the vectors $E_1+E_2$, added together, and labelled in respect to the significance of the various parameters of Equations 1–3 inclusive. In the discussion which follows it is taken that $qt=0$ when $E_2$ is collinear with and directed in the same sense as $E_1$, i. e., at the crests of the beat frequencies.

It may be shown, then, that $$(4) \qquad \frac{d(wt+\alpha)}{dt}=w+\frac{aq(a+\cos qt)}{R^2}$$

$$(5) \qquad \frac{dR}{dt}=-\frac{aq \sin qt}{R}$$

$$(6) \qquad =-a \sin \alpha$$

$$(7) \qquad R\frac{d(wt+\alpha)}{dt}=Rw+\frac{aq(a+\cos wt)}{R}$$

(8)

$$\int_0^{\psi} \frac{Rd(wt+\alpha)}{dt}d(qt)=2(1+a)E(\psi/2,k)w+[(1+a)E(\psi/2,k)-(1-a).F(\psi/2,k)]q$$

where $$k^2=\frac{2a}{(1+a)^2}$$

When the values of the quantities R, $$\frac{d(wt+\alpha)}{dt}+R\frac{d(wt+\alpha)}{dt}$$

are calculated for certain values of $qt$, the following Table I may be constructed. This table gives the values of the quantities in terms of $a$, $q$ and $w$ when $$qt=\pm\frac{\pi}{2}$$

0 and $\pi$ radians and for two further values, i. e., for the difference and the sum of the quantities, taken at 0 and $\pi$ radians.

*Table I*

| | qt | (1) $\pm\pi/2$ | (2) 0 | (3) $\pi$ | (4) $(0)-(\pi)$ | (5) $(0)+(\pi)$ |
|---|---|---|---|---|---|---|
| (a) | $R$ | $\sqrt{1+a^2}$ | $1+a$ | $1-a$ | $2a$ | 2 |
| (b) | $d(wt+\alpha)/dt$ | $w+\frac{qa^2}{1+a^2}$ | $w+\frac{qa}{1+a}$ | $w-\frac{qa}{1-a}$ | $\frac{2qa}{1-a^2}$ | $2w-\frac{2qa^2}{1-a^2}$ |
| (c) | $Rd(wt+\alpha)/dt$ | $\sqrt{1+a^2}\cdot w+\frac{qa^2}{\sqrt{1+a^2}}$ | $w(1+a)+qa$ | $w(1-a)-qa$ | $2a(w+q)$ | $2w$ |

It is apparent, from Equation 2 that $R^2$ varies with cos $qt$, which means that the superposed waves $E_1$ and $E_2$, in the sum, are amplitude modulated in accordance with a cosine function at the frequency $q$. This is also intuitively obvious from Figure 1. The frequency $q$ can readily be derived then from the superposed waves by means of an amplitude detector. Values of $$\frac{d(wt+\alpha)}{dt}$$

may be measured by means of a limiter and discriminator.

In accordance with the present invention, selected portions of the radio frequency envelope of the superposed waves may be gated under the control of the modulation wave at frequency $q$, to obtain the frequency $$\frac{d(wt+\alpha)}{dt}$$

for only the angles or values of $qt$ specified in Table I, columns (1), (2), (3). When so obtained simple voltage combinations provide the quantities specified in columns (4) and (5).

Additionally the quantity $$R\frac{d(wt+\alpha)}{dt}$$

may be derived at the angles specified in columns (1), (2) and (3), by multiplying the value of R at these angles by the value derived for $$\frac{d(wt+\alpha)}{dt}$$

at these angles, in a conventional multiplier, the value of R being obtainable by suitably gating the result of amplitude detecting the superposed waves. The values required for columns (4) and (5) may be derived by simple subtraction or addition of voltages, as required.

From the quantities specified in rows $b$ and $c$, the frequencies $w$ and $(w+q)$ may be readily derived.

For example, the quantity specified in block 5$c$ of Table I is a multiple of the frequency $w$, and the quantity specified in block 4$b$ contains solely the frequency $(w+q)$.

Since the frequency $q$ may be readily derived by a demodulation process, addition or subtraction of frequencies in suitable circuits may be employed to obtain the quantities in the remaining blocks.

As one mode of receiving the stronger of two overlapping frequency modulated signals to the exclusion of the weaker, use may be made of the fact that when $$\frac{d\alpha}{dt}=0$$

$$\frac{d(wt+\alpha)}{dt}=w$$

and that this may be calculated to occur when $qt=\pi\pm$ arc cos $\alpha$. If, therefore, the radio frequency at one or both of these points, in each cycle of beat frequency, is selected and applied to a discriminator, the result will be the stronger signal at frequency $w$, free from distortion due to the weak signal.

In accordance with one specific embodiment of the present invention, utilized for obtaining the weaker of two frequency modulated signals, the process involved is one of determining the algebraic sign of $q$ by comparing $$\frac{d(wt+\alpha)}{dt}$$

at $qt=0$ and $qt=\pi$. The difference at these points is proportional to $q$, as indicated in block 4$b$ of Table I, and will be positive or negative according as $q$ is positive or negative, i. e., according as $(w+q)$ is greater or less than $w$. This difference is then used to determine in which polarity the frequency $q$ should be added to $w$ to give $(w+q)$, the weaker signal. In accordance with this species of the invention the frequency $q$ may be added to the frequency $w$ by shifting the local oscillator of the receiver of the superposed signals by an amount $q$, by means of a reactance tube.

In accordance with an alternative method of effectively adding the frequencies $q$ and $w$, the frequency $q$ and the frequency $w$ may be detected by separate frequency discriminators, and the outputs of the discriminators added to provide an audio voltage proportional to $(w+q)$.

Figure 2:
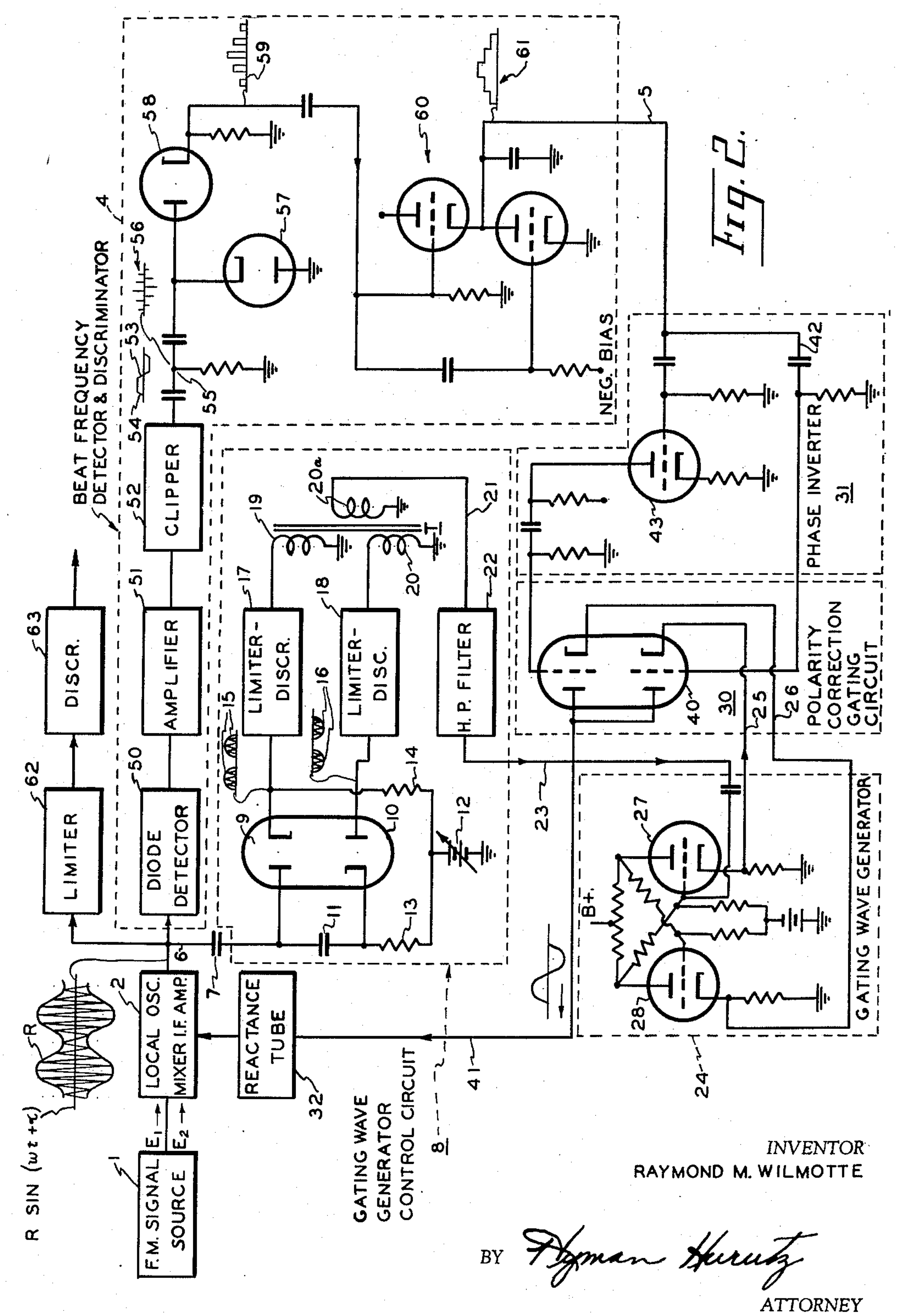
Figure 2 illustrates schematically a circuit diagram of a specific embodiment of the invention.

Referring now more specifically to the drawings, and particularly to Figure 2 thereof, there is illustrated in functional block diagram a system for the separation of a weaker FM signal from a stronger co-channel signal.

The reference numeral 1 denotes a source of two FM co-channel or overlapping signals $E_1$ and $E_2$. These are applied to a mixer, local oscillator and I. F. amplifier 2, in accordance with conventional practice in the art of superheterodyne reception of FM signals, the two signals in superposed relation appearing at intermediate frequency at the output of the circuit 2 in the form of a beat wave $R$ sin $(wt+\alpha)$, which represents the sum of the signals $E_1+E_2$. The signal $R$ sin $(wt+\alpha)$ is applied to a beat frequency discriminator 4 which produces a voltage output proportional to the beat frequency $q$, at each instant (in a manner to be described hereinafter), applying this voltage to a lead 5.

The I. F. output is further applied via a lead 6 and a coupling condenser 7 to a gating wave generator control circuit 8. The latter comprises a back-to-back diode circuit, comprising a first diode 9 having its anode connected to coupling condenser 7, and a second diode 10 having its cathode connected via coupling condenser 11 to the anode of diode 9, and hence to coupling condenser 7. A source 12 of positive bias voltage is provided, which may be adjustable in magnitude, and having its negative terminal grounded and its positive terminal connected via a load resistor 13 to the cathode of diode 10 and via a load resistor 14 to the cathode of diode 9. The load resistors 13 and 14 may be of equal magnitude, and the diodes 9 and 10, being oppositely poled, are equally loaded and biased. The bias voltage provided by bias source 12 is set to the mean value of the positive peaks and troughs of the wave $R\sin(wt+\alpha)$, so that there is generated in resistance 14 signals corresponding with the peaks, and in the resistance 13, signals corresponding with the troughs, as illustrated at 15 and 16 respectively. These waves correspond, in frequency with $R(wt+\alpha)$ around $qt=0$ and around $qt=\pi$, respectively.

The peaks 15 are applied to a limiter and discriminator 17, and the troughs 16 to a limiter and discriminator 18 having identical response curves, and having their outputs connected in series across primary windings 19 and 20 of a transformer T, in opposite senses, respectively, so that in the secondary winding 20*a* is generated a difference voltage.

The frequency in the positive peaks 15, and the frequency in the negative peaks 16, of the beat envelope $R\sin(wt+\alpha)$, are different, and oppositely directed with respect to the frequency $w$, these frequencies being given approximately by the value of $$\frac{d(wt+\alpha)}{dt}$$

for angles of $qt=0$ and $\pi$ (see Table I), and further depend upon whether $q$ is positive or negative, i. e. upon whether $(w+q)$ is greater or smaller than $w$. The discriminators 17 and 18 are tuned to $w$ at its mean value, for zero response, and accordingly the outputs of the discriminators 17 and 18 will be respectively always of different amplitudes, and the polarity of the difference of the outputs of discriminators 17 and 18, appearing across primary windings 19 and 20, will be determined by the algebraic sign of $q$.

The output of discriminator 17 is developed across primary winding 19 and the output of discriminator 18 across primary winding 20, and these windings being coupled in opposing relation, the outputs are subtracted. The difference voltage, as it appears across secondary winding 20*a*, is then approximately proportional to $$\frac{2qa}{1-a^2}=kq$$

from Table I, and has the proper polarity, at each instant of time and in response to the algebraic sign of $q$, to account for the relative values of $(q+w)$ and $w$ at each instant of time. The difference voltage is applied via lead 21 and high pass filter 22, which is designed to pass all beat frequencies falling above the audio rate (if speech is transmitted) and to reject all frequencies falling within the audio band. The filter 22 is required in order to eliminate spurious signals corresponding with modulations of the separate carriers $E_1$ and $E_2$, and not due to the beat envelope. Use of the filter 22 results in loss of certain components due to the beat envelope of $E_1$ and $E_2$, but these occur relatively seldom in the audio band, and hence may be dispensed with in practical operation.

The output of filter 22 is the control signal output of gating wave generator control circuit 8, and is of positive or negative polarity, in accordance with the algebraic sign of $q$, and appears on lead 23.

The control signal appearing on lead 23 is applied to a gating wave generator 24 which generates a wave of fixed magnitude and of alternate polarity, in response to control signals of alternate polarity. In accordance with one preferred embodiment of the invention, the gating wave generator 24 consists of an Eccles-Jordan flip-flop circuit, of known character and mode of operation, per se, which provides a positive pulse of known magnitude on output lead 25 in response to a positive signal of any substantial magnitude on input lead 23, and a positive voltage of the same magnitude on output lead 26 in response to a negative signal of any substantial magnitude on input lead 23. Since triodes 27 and 28 of the Eccles-Jordan circuit are either on or off, in alternation, and since the leads 25 and 26 are connected to the cathodes of the triodes, the leads 25 and 26 are either of fixed positive polarity or at ground potential.

The leads 25 and 26 apply gating waves to a polarity correction gating circuit 30, to which is also applied the output of beat frequency discriminator and detector 4, via a phase inverter 31. It is the function of the phase inverter 31 to apply the signal of frequency $q$, derived from the beat frequency discriminator and detector 4 in paraphase relation to the polarity correction gating circuit 30. The latter, then, in response to the gating waves supplied by leads 25 and 26, passes the signals at frequency $q$, in one polarity or another, depending upon which of the leads 25, 26 carries gating wave, and hence depending on the algebraic sign of $q$. The output of the polarity correction gating circuit is then applied to a reactance tube 32, associated in conventional fashion with the oscillator of local oscillator, mixer and I. F. amplifier 2, to modulate the I. F. wave in such sense and to such degree as to add to the frequency of wave $w$ the frequency of the wave $q$. The output of the I. F. amplifier of higher amplitude thus approaches $(w+q)$, the weaker of the two signals.

The polarity correction gating circuit 30 comprises a double triode 40, having its anodes tied together and connected via lead 41 with reactance tube 32. The cathodes of the double triode 40 are connected respectively to the cathodes of triodes 27 and 28, and accordingly are maintained at ground potential or at a fixed positive potential, in accordance with the condition of the Eccles-Jordan gating wave generator 24. Making a cathode of double triode 40 positive, since the control electrodes are fixed at ground potential for steady D.-C., biases the corresponding tube section to cut-off. The action of the gating wave generator 24 on the polarity correction gating circuit is then to determine which of the sections of double triode 40 shall pass signal to lead 41.

To the control electrodes of double triode 40 are applied the signals derived by frequency discrimination of the beat frequency $q$, and available on lead 5. These signals are applied directly to one control electrode of double triode 40 via lead 42, and to the other control electrode via a phase reversing triode 43, of conventional character per se, and arranged to have little gain. The signals, as they are applied to the separate control electrodes of double triode 40, are arranged, by suitable selection of circuit parameters, to be of precisely equal amplitudes, and of opposite phases. The determination of the phase of output of the polarity correction gating circuit 30 is thus a function of the algebraic sign of $q$, since it is the algebraic sign of $q$ which determines the polarity of the control signal provided by gating wave generator control circuit 6, and hence determines which of leads 25, 26 shall carry a positive biasing signal to double triode 40 from gating wave generator 24.

In order to derive a signal proportional in amplitude to the frequency of $q$, for application to lead 5, the I. F. signal $R \sin (wt+\alpha)$ is applied to a diode detector 50, which provides at its output an amplitude modulated signal corresponding at each instant with the amplitude of the envelope of $R \sin (wt+\alpha)$. The detected signal is amplified in an amplifier 51 and then clipped to uniform level in clipper 52. At the output of the latter is then provided a clipped wave 53, of constant amplitude, but of variable frequency. Since the clipped wave 53 is derived from a frequency modulated wave the build up time of the sides 54 of the waves is a function of this frequency and of this frequency only. This is so since the amplitude of R is constant, or may be maintained so by conventional automatic volume control circuits. The clipped wave 53 is then applied to a differentiating circuit 55, which provides at its output pulses 56 having amplitudes proportional to the slopes 54. Accordingly, the envelope of the pulses 56 is representative of the amplitude of the wave $q$. The negative portions of the pulses 56 are removed by diode 57, while the positive portions are selected by diode 58, the output circuit of which has a sufficiently long time constant to lengthen the pulses.

The amplitude modulated positive pulses 59 derived from diode 58 are then impressed on an integrating circuit 60, which is fully described and illustrated in U. S. Patent #2,466,705 issued to Hoeppner, and which operates to smooth out the discontinuities present in the pulses 59, and providing at lead 5 a substantially continuous wave 61 which follows the peaks of the pulses 59, and which corresponds in its wave shape with the variation in the value of $q$, and is substantially without the discontinuities which, if not removed, would cause distortion of the intelligence when the pulse repetition rate is audible.

The output of the gating circuit 30 is applied via lead 41 to the reactance tube 32 which controls the frequency of the local oscillator of oscillator, mixer, I. F. amplifier 2, varying the frequency of the oscillator in a sense determined by the algebraic sign of $q$, and to an extent determined by the numerical values of $q$.

The effect of this variation in local oscillator frequency is to add to stronger wave $w$ the frequency $\pm q$, producing a stronger wave at the frequency $(w \pm q)$ which is the original frequency of the weaker signal. The signal $(w \pm q)$ at the output of the I. F. amplifier is now applied to limiter and discriminator 62 and 63, which detects the signal $(w \pm q)$. The detected signal may then be utilized in conventional fashion. The embodiment of my invention illustrated in Figure 2 of the drawings is useful then, particularly for abstracting from a weak and a strong overlapping FM signal, the modulation of the weak signal, or the weak signal itself, to the exclusion of the strong signal, whereas in the conventional FM receiver the weak signal is inherently lost and the strong signal received.

Essentially this is accomplished by shifting the frequency of the strong signal an amount adequate to transform that frequency to the frequency of the weak signal, so that the amplitude of the strong signal is available at the frequency of the weak signal. This interchange of frequencies and amplitudes constitutes one important feature of the present invention.

Figure 3:
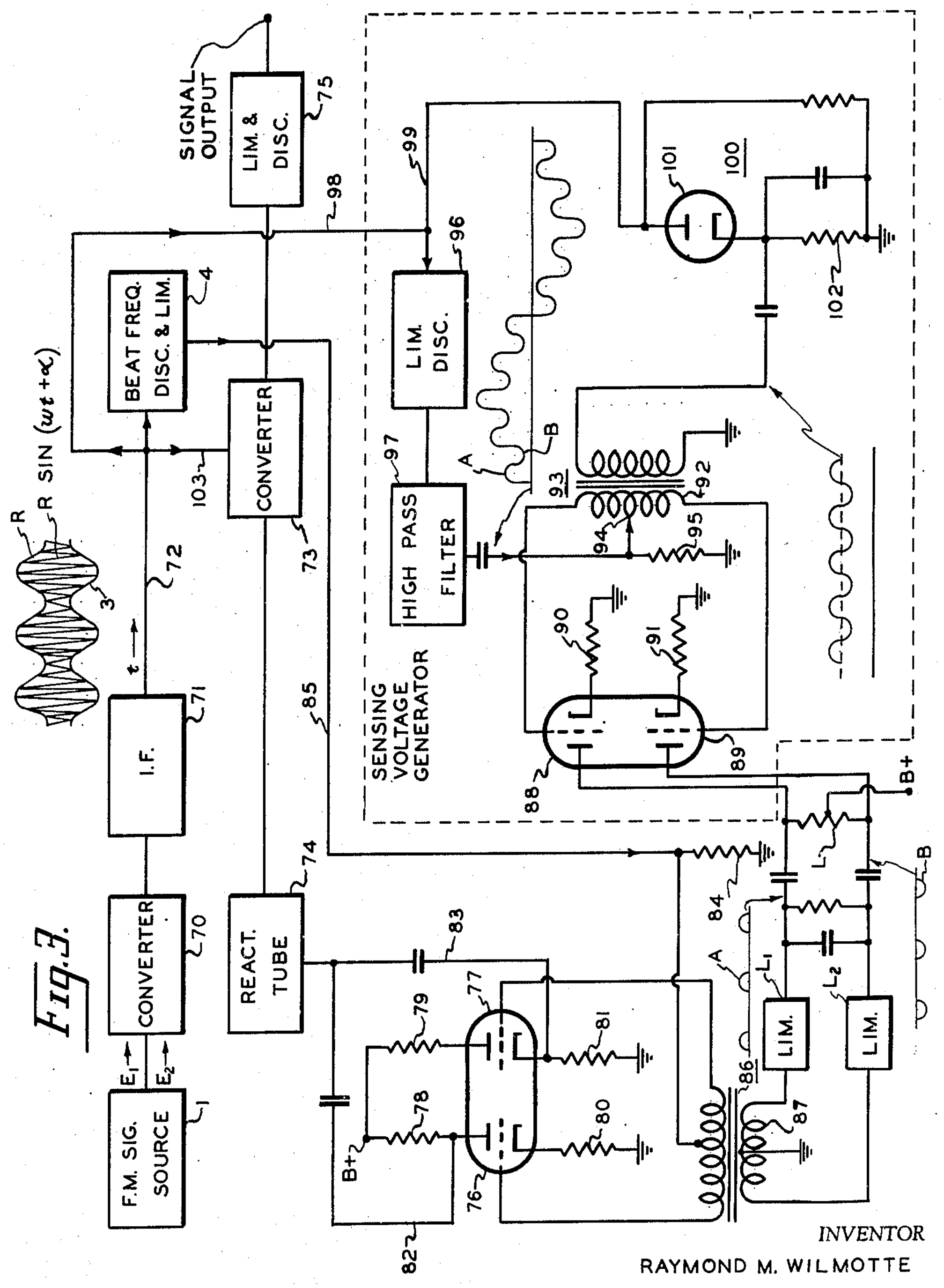
Figure 3 is a schematic diagram of a variant of the system of Figure 2.

In accordance with a further embodiment of the present invention, illustrated schematically in Figure 3 of the drawings, modified polarity sensing and gating circuits are employed in a system generally similar to the system of Figure 2. Identical circuit components in Figures 2 and 3 have been assigned identical, numerals of reference.

Referring now more specifically to Figure 3 of the accompanying drawings, a source of signals 1 is provided which transfers signals $E_1$ and $E_2$ to a frequency converter 70. The latter converts the signals presented to it to a frequency suitable for amplification in an intermediate frequency amplifier 71, whence the signals are transferred via a lead 72 to the beat frequency limiter and discriminator 4.

It is the purpose of the invention to modify the frequency modulations inherent on the stronger of the signals $w$ in such a manner as to translate these into modulations corresponding with those on the weaker of the two signals, $w+q$, by adding to $w$ a frequency $q$ equal instantaneously to the difference in frequency between the weak signal $w+q$, and the strong signal $w$.

In accordance with the embodiment of my invention illustrated in Figure 3 of the drawings, the modification of the modulation of the stronger signal $w$, which is required in order to carry out the principles of the invention, is accomplished by frequency modulating the local oscillator of auxiliary frequency converter 73 in response to voltages applied to reactance tube 74. The output of the converter 73 may then be detected by limiter and discriminator 75. That portion of the system illustrated in Figure 3 of the drawings which has been described in the preceding paragraph corresponds, then, broadly with the corresponding portions of the system illustrated in Figure 2 of the drawings, except that an auxiliary converter is employed.

In accordance with the system illustrated in Figure 3 of the drawings, a pair of gating tubes 76 and 77 are provided, having anodes which are connected in parallel via anode resistors 78 and 79 to a source of B+ voltage. The cathodes of the triodes 76 and 77 similarly are provided with cathode loads 80 and 81. Accordingly, the gating tubes 76 and 77 are provided with identical load circuits. However, the gating tube 76 has its output derived from its anode by means of a lead 82, whereas the gating tube 79 has its output derived from the cathode load 81, by means of a lead 83. Accordingly, in response to voltage of identical phase or polarity applied to the control electrodes of the gating tubes 76 and 77 output voltages of opposite polarities will be produced in the respective gating tubes. Further, if the voltage applied to the control electrodes of gating tubes 76 and 77 in identical polarity are positive, the output provided on the lead 83 will be positive and that provided on the lead 82 will be negative. Alternatively, if the applied voltage is negative the voltage generated on the lead 83 will be negative and that on the lead 82 will be positive. The leads 82 and 83 are connected in parallel to the input to the reactance tube 74 for the purpose of controlling the latter to change the frequency of the local oscillator of the converter 73.

The voltage which is applied simultaneously and in the same polarity to both grids of the gating tubes 76 and 77 is derived across a resistance 84, to which it is applied by a lead 85 connected to the output of the beat frequency discriminator and limiter 4, and this voltage accordingly corresponds with $q$ or is a voltage proportional to the frequency $q$, or to the frequency difference between the weaker and the stronger of the two signals $E_1$ and $E_2$, but is always of the same polarity, regardless of the algebraic sign of $q$.

This voltage corresponding in amplitude with the frequency of $q$, is applied to the control electrodes of the gating triode sections 76 and 77 in parallel, but is arranged to be of such magnitude relative to the normal bias voltages applied to triode sections 76 and 77, that no output signal is generated in either triode section 76 or 77.

The gating triode sections 76 and 77 are selectively controlled to be conductive by means of a transformer 86, the secondary of which is connected in push-pull relation to the control electrodes of the triodes 76 and 77, and to the center tap of the secondary of which is connected the voltage available across the resistance 84. To the primary 87 of the transformer 86 are then applied polarity sensing voltages, for determining which one of the gating tubes 76 and 77 shall be operable to pass the voltage across the resistance 84, and, accordingly, to determine in which polarity that voltage shall be applied to the reactance tube 74.

The primary winding 87 of the transformer 86 is connected in push-pull relation to the anodes of the triode sections 88 and 89, via limiters $L_1$ and $L_2$ introduced in the lead from each of anodes 88 and 89 to the primary winding 87. The center tap of the latter is grounded, and anode voltage is supplied to the anodes of triode sections 88 and 89 and output voltage derived therefrom, by means of a load resistor L, connected between the anodes, and to the center tap of which a source of B+ voltage is connected.

The cathodes of the triode sections 88 and 89 are connected to ground through biasing resistors 90 and 91 respectively. The control electrodes of the triode sections 88 and 89 are connected in push-pull relation to the secondary winding 92 of a transformer 93, which is provided with a center tap 94, to which is applied the voltage developed across a resistance 95 by the output of a limiter and discriminator 96 via a high pass filter 97. The limiter and discriminator 96 is in turn supplied with superposed signals $E_1$ and $E_2$ at I. F. frequency from the I. F. amplifier 71. The output of the limiter discriminator is filtered by high pass filter 97, which serves to remove audio frequencies and to pass frequencies higher than audio. The latter are obviously all due to beats, while the former are not. Accordingly, the control electrodes of triode sections 88 and 89 are driven in phase by that portion of the output of limiter and discriminator 96 which is due to beats between $E_1$ and $E_2$.

Additionally, the control electrodes of triode section 88 and 89 are driven in opposite phase by a voltage appearing across the secondary winding 92 of the transformer 93, derived as follows. The output of the I. F. amplifier 71 is applied via the leads 98 and 99 to an amplitude detector 100, which may comprise the usual cathode loaded diode 101, from the cathode resistor 102 of which may be derived amplitude detected voltage, in response to the beat frequency modulated carrier applied to the detector 100, i. e., the envelope of the beat frequency, or the amplitude of R. The latter is applied to the primary winding of transformer 93.

Accordingly, the triodes sections 88 and 89, driven in push-pull by the voltage developed across resistor 102, pass current in alternation, one in response to the peaks of the beat frequency envelope and the other in response to the troughs of the beat frequency envelope. The current which is passed is that which is applied in phase to both control electrodes of triode sections 88 and 89 by the limiter and discriminator 96. As will be evident from consideration of Table I, the frequency available at the peaks will be greater if $q$ is positive than the frequency available at the troughs, while the opposite condition will obtain if $q$ is negative, i. e., the phase of the output of discriminator 96 reverses as the algebraic sign of $q$ reverses. Thus, the triode section 88 will pass more positive voltages A and the triode 89 less positive voltages B for $q$ positive while the opposite condition will obtain for $q$ negative. The time constants present in the output circuits of triode sections 88 and 89 assure that the average current flow in primary winding 87 is proportional to the difference between peak A and peak B at each instant rather than to the amplitudes of the peaks themselves. Accordingly the direction of resultant current flow in the primary winding 54 has two possible values, which are determined by the algebraic sign of $q$, in sign, and by the limiters $L_1$ and $L_2$ in magnitude, and the sense in which the control voltage proportional to the bead frequency $q$, applied in phase to the control electrodes of gating triodes 76 and 77, is transferred to the reactance tube 74 by gating tubes 76 and 77, accordingly, depends similarly upon the algebraic sign of $q$.

In the system of Figure 3, the output of the reactance tube 74 is utilized to control the frequency of frequency converter 73 to which is applied the output of the I. F. amplifier 71 via the lead 103. Accordingly, in the system of Figure 3 the output of the converter 70 is not frequency modulated by the reactance tube 74, but this frequency modulation takes place entirely in the auxiliary converter 73, and it is the output of the auxiliary converter 73 which is applied to the limiter and discriminator 75, whence is derived the useful signal corresponding with the frequency modulations of the weaker of the two input signals $E_1$ and $E_2$.

Reference is now made specifically to Figure 4 of the accompanying drawings, which is a modification of the system illustrated in Figure 2 of the drawings. The corresponding elements of the modifications illustrated in Figure 2 and Figure 4, have been identified by identical numerals of reference, and those parts of the two circuits which are identical, and which operate in identical manner, are not further described, in order to avoid redundancy.

In the system of Figure 2 an output voltage representative at the beat frequency $q$ between two carriers $E_1$ and $E_2$ is developed on the lead 41, and is applied to a reactance tube 32 for varying the frequency of a local oscillator comprised in a local oscillator, mixer and I. F. amplifier 2. The latter supplies its output frequency to a limiter and discriminator 62, 63, which is per se conventional. In the normal operation of a limiter and discriminator, such as that represented by the blocks 62, 63, the stronger of two signals which are overlapping and frequency modulated, is detected to the exclusion of the weaker of the two signals, provided a sufficient difference in amplitude exists between the two signals. In the system of Figure 2, the fact that the local oscillator of the oscillator mixer I. F. amplifier 2 is varied in accordance with the beat frequency $q$ which exists between the signal of higher amplitude $E_1$ and the signal of lower amplitude $E_2$ results in an output from the I. F. amplifier of circuit 2 which corresponds in amplitude with the signal of greater amplitude $E_1$, but which has been modulated in such a way as to correspond in its frequency deviations with the signal of lower amplitude $E_2$. Otherwise stated the signal $E_1$ is modified to have an instantaneous frequency $w+q$, where $w$ is the frequency of the signal of higher amplitude, and $w+q$ the frequency of the signal of lower amplitude. Accordingly, variation of frequency of the local oscillator of oscillator, mixer, I. F. amplifier 2 constitute a mode of adding the beat frequency between the signals $E_1$ and $E_2$ to the frequency of the stronger of the two signals, the latter then having all the frequency deviations of the weaker, but remaining the stronger, and hence susceptible to conventional demodulation.

In the system of Figure 4 a different mode is utilized of modifying the stronger signal to provide the weaker, this mode involving superposition of two voltages, one corresponding with the frequency of the stronger signal and the other to the frequency of the beat frequency.

For this purpose the output of the polarity correction gating circuit 39, is applied to one winding 101 of a transformer 102. With proper design then, the current flowing in the winding 101 has at all times an amplitude representative of the beat frequency $q$, and has a polarity moreover, which is representative of the alegbraic sign of $q$, or otherwise stated which depends on whether $q$ is such that $w+q$ is greater or less than $w$ in frequency.

The oscillator, mixer, I. F. amplifier 2 is not provided with a reactance tube, but the oscillator thereof remains always at the same frequency, except when the receiver is tuned. Accordingly, the output from the limiter-discriminator 62, 63 corresponds with the detected signal $E_1$, or the modulations of the stronger of the two overlapping frequency modulated waves. This output is applied to a second winding 103 of transformer 102, and accordingly the current flowing in the winding 103 is representative of modulations of the stronger signal.

The windings 101 and 103 are wound on a common core 104, and the relative winding senses of the windings 101 and 103 are so chosen, as by trial, that the total induced voltage in a secondary winding 105, which is wound on the core 104, corresponds to the sum of the modulations representative of frequency variations of the stronger of the two carriers $E_1$ and of the frequency of the beat $q$ between the stronger and weaker signal. Accordingly, the voltage induced in the secondary winding 105 is representative of the modulation of the weaker signal, and the winding 105 may be used as an output winding of the receiving system illustrated in Figure 4, in conventional and well known fashion, which are not per se described or illustrated.

The modifications of the system of Figure 2 which are required to arrive at the system of Figure 4 of the accompanying drawings may obviously be applied to the system of Figure 3, to enable derivation of a modulation signal representative of the signal $E_2$, at frequency $w+q$, by adding a voltage wave representative of the instantaneous frequency of the stronger signal $E_1$ to a voltage wave representative of the beat frequency between the signals $E_1$ and $E_2$, rather than by variation of the local oscillator frequency of converter 73.

In Figure 5 of the accompanying drawings in a modification of the system of Figure 2, corresponding numerals of reference referring to identical circuit elements in the two figures. The modification of Figure 2 involves the concept otherwise illustrated in Figure 3 of employing a separate mixer 110, connected to the source 1 of signals $E_1$ and $E_2$, and supplying an I. F. amplifier 111, limiter 112, and frequency discriminator 113 with frequency modulated signals. The latter, in normal operation, would select the stronger signal $E_1$ to the exclusion of the weaker signal $E_2$. However, in accordance with the present invention, the mixer 110 is supplied with local oscillator signal by means of an oscillator 114 which is frequency modulated by reactance tube 115, and the latter is controlled by the detected and properly poled signal derived from frequency detection of signal $q$, and available at the output of gating circuit 39. The circuit of Figure 2 is essentially then, one which operates to combine $w+q$ and $q$ by negative feedback to the reactance tube which controls the local oscillator of the system. The circuit of Figure 5 provides no negative feedback, but rather a straight forward superheterodyne channel, and in which $w+q$ and $q$ are combined by means of a converter extraneous to the receiver channel proper.

In the embodiment of my invention illustrated in Figure 2 of the accompanying drawings the audio signal corresponding with $q$ is derived by a process which involves polarity reversals in response to sensing operations performed on the beat between signals $E_1$ and $E_2$. The sensing operation involves frequency discrimination of the peaks and troughs of the beat, which involves, inherently, discrimination of the individual waves, and hence gives rise to signals which do not have their origin in the beat frequency $q$ and hence are inappropriate for causing polarity reversals. To eliminate these undesired signals use is made of the fact that the beat frequencies vary in general at a superaudible rate, while the undesired signals are audible. The latter are accordingly filtered out. However, the filtering process does remove the desired signals which are essential to effect phase reversals of the $q$ signal, at those relatively infrequent times when they occur outside the filter pass band. To this extent some distortion is produced in the system of Figure 2. For similar reasons some distortion is produced in the embodiments of my invention illustrated in Figures 3–5 inclusive, which is slight, but nevertheless undesirable.

Figure 6:
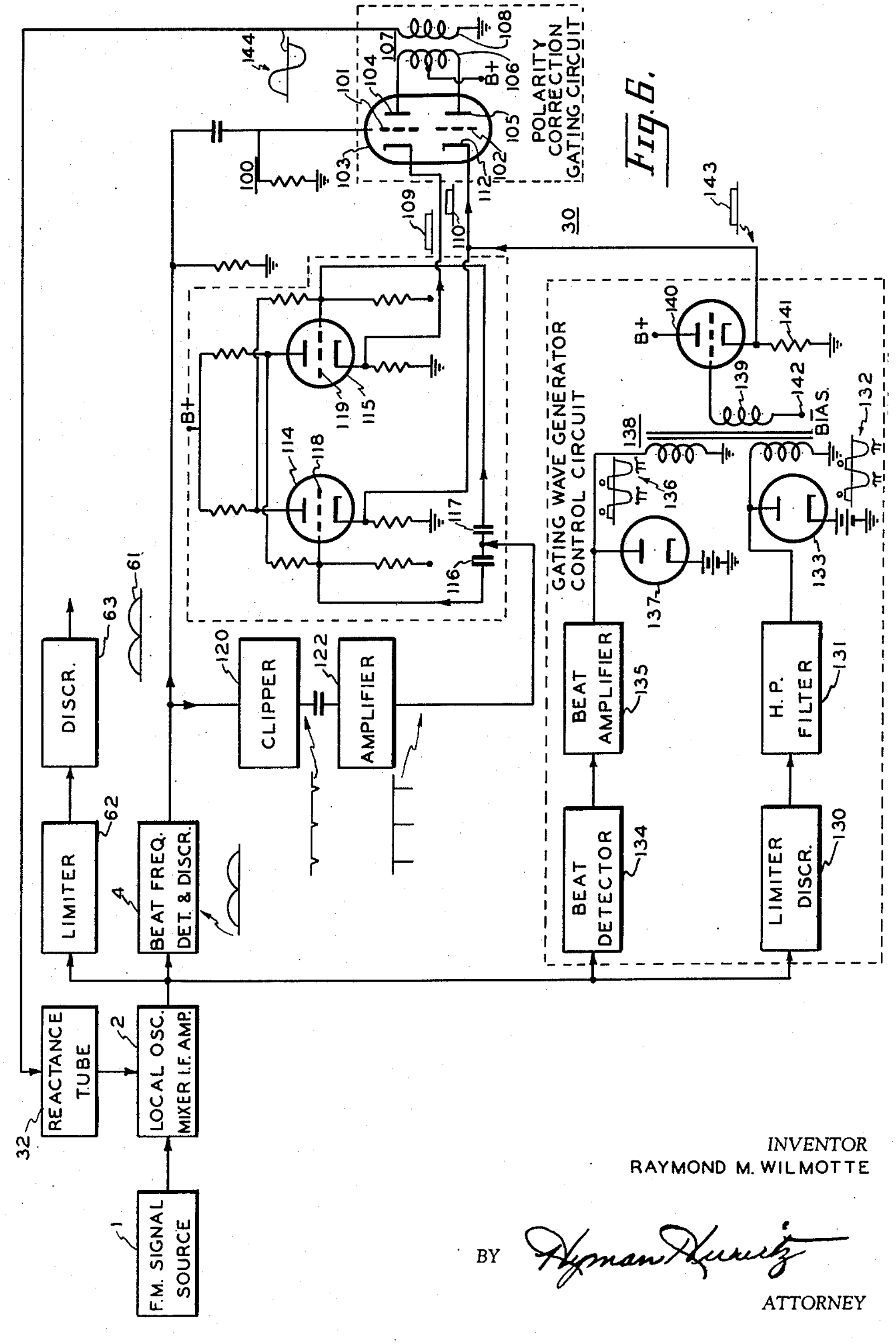

The system of Figure 6 represents an embodiment of the present invention in which substantially no distortion occurs for the reasons stated in the previous paragraph.

It will be noted that phase reversal of the detected signal $q$ should take place when $q$ changes algebraic sign, which occurs precisely when $q$ has a value of zero, or at zero beat between the waves $E_1$ and $E_2$. Accordingly, zero beat between waves $E_1$ and $E_2$ may be detected and for each occurrence a phase reversal of the detected signal $q$ caused to occur. One difficulty which may be expected to occur in a system of the character described in this paragraph is that if, for any reason, a single phase reversal fails to occur when it should, or occurs when it should not, the phase of the audio signal corresponding with $q$ is from then on precisely reversed from its correct value. In accordance with the embodiment of the invention illustrated in Figure 6 of the accompanying drawings the condition of the phase reversing circuit is corrected at very short intervals in accordance with a correction signal derived by comparing the frequency content of the beat between waves $E_1$ and $E_2$ with the amplitude of the beat, as in the system of Figure 2. The correction signal is then available at superaudio frequencies, but not at audio frequencies. The zero beat responsive phase reversing signals are available at all frequencies, audio and superaudio. The correction signal corrects the zero beat responsive phase reversing signals as required, and the latter are then required to be correct, or to establish phase reversals without assistance of the correcting signal, for only a small percentage of the total operating time. Thereby the total possible time during which the audio signal corresponding with $q$ is of the wrong phase is rendered negligible, in practical embodiments of the system.

Referring now specifically to Figure 6 of the drawings, and utilizing the same numerals of reference in the systems illustrated in Figures 2 and 6, the two frequency modulated signals $E_1$ and $E_2$ are supplied by a source 1 to a local oscillator, mixer and I. F. amplifier 2, and from the latter to a beat frequency detector and discriminator 4, at the output of which is available a signal 61, having amplitudes at each instant corresponding with the frequency of $q$, but always the same polarity, regardless of the algebraic sign of $q$.

The signal 61 corresponding in amplitude to the frequency of $q$ is applied via a coupling circuit 100 simultaneously to both control grids 101, 102 of a double triode 103, which together with its control circuits and output circuits performs the function of polarity correction gating circuit 30 of Figure 2, and hence is given the reference numeral 30a. Corrected to the anodes 104, 105 of double triode 103 in push-pull relation is the primary winding 106 of an output transformer 107, having a single ended secondary winding 108. Accordingly, the phase of the output signal derivable from secondary winding 108 depends on which section of the double triode 103 is conductive.

The separate sections of double triode 103 are rendered alternately conductive by applying positive gating waves or voltages 109, 110 to the separate cathodes 111, 112 respectively.

The gating waves or voltages 109, 110 are derived from a gating wave generator 24a, as in the system of Figure 2, which controls the polarity correction gating circuit, 30a, comprising double triode 103, precisely as the analogous polarity correction gating circuit 34 of Figure 2 is controlled by the gating wave generator 24 of Figure 2.

The gating wave generator 24a comprises a flip-flop circuit having two cross coupled triodes 114, 115, and is of well known nature per se. The triodes 114, 115 are arranged to conduct in alternation in response to negative pulses applied simultaneously via coupling condensers 116, 117 to the control grid 118, 119 of the triodes. That one of triodes 114, 115 which is conductive when a pulse is impressed becomes non-conductive in response to the pulse and that one of triodes 114, 115 which is non-conductive becomes conductive, regardless of the original status of the flip-flop circuit. The mode of operation of the flip-flop circuit is per se well known, and accordingly is not explained in detail herein.

The actuating pulses for the flip-flop circuit comprising triodes 114, 115 are derived from the output of the beat frequency detector and discriminator 4 in the following manner. It will be recalled that the output of the beat frequency detector and discriminator 4 corresponds with a full wave rectified audio wave 61, i. e. the wave contains audio signals but never reverses in polarity. Were the wave 61 to be transformed into a true audio wave alternate lobes thereof would have to be reversed in polarity, in general, and this operation would be required to occur precisely when the amplitude of the wave reaches zero, since it is at this moment that the value of $q$ is zero, as its algebraic sign changes from plus to minus, or vice versa. Since the gating wave generator 24a, which causes phase reversals of wave 61, is responsive to negative actuating pulses, it is required to generate these actuating pulses at the zero points of the waves 61.

To this end, the waves 61 are applied to a clipper 120, at the output of which is available a wave 121 of generally constant level, except at the zero points of the wave 61, where occur similar zero points. The wave 121 is amplified in an amplifier 122, capacity coupled thereto, so that the constant portion of the wave is eliminated, and the variations 120 thereof transferred, at relatively high amplitude, via lead 124, to the junction point of condensers 116, 117.

If the circuits of the system of Figure 6 operates perfectly, i. e., if each zero point of wave 61 corresponds with a change of polarity of $q$, and if no extraneous noise pulses actuate the gating wave generator 24a, and if no actuating pulses are missed, and if the output wave on transformer secondary winding 108 is initially of proper polarity, the output waves will remain of proper polarity, and the audio signal corresponding with $q$ will be accurately detected. Unfortunately, this condition of affairs cannot be assumed to continue for long, and it is essential that means be provided for correcting the condition of the gating wave generator at frequent intervals, in order that any incorrect condition shall not persist.

It is essential, then, to introduce into the present system devices for continually checking and correcting the operative condition of the gating wave generator, for the reasons provided in the previous paragraph. To accomplish this function the waves $E_1$ and $E_2$, as they appear at the output of local oscillator, mixer and I. F. amplifier 2, are applied to a limiter and discriminator 130, center tuned to the I. F. frequency. The output of the limiter-discriminator 130 then corresponds in amplitude to $$w+\frac{d\alpha}{dt}$$

and will be found to have a higher value at the peaks of the wave R, when $q$ is positive, and a lower value at the troughs, and to have a lower value at the peaks, when $q$ is negative, and a higher value at the troughs.

The output of the limiter and discriminator 130 is passed through a high pass filter 131, to eliminate audio components of signal which may be unrelated to the frequency $q$, and the filtered wave is then clipped, at its positive lobe, to a fixed value, as at 132, by means of a biased diode 133.

The wave $R \sin (wt+\alpha)$ is also applied to a beat detector 134, which detects the amplitude envelope of the wave $R \sin (wt+\alpha)$. The latter is amplified in amplifier 135, and its positive lobes clipped to a fixed level, as at 136, by a biased diode 137.

Since the positive peaks of the wave 136 correspond in phase with the phase of $R \sin (wt+\alpha)$, and since the phase of wave 132 depends, in relation to the phase of $R \sin (wt+\alpha)$ on whether $q$ is positive or negative, a phase comparison of the waves 132 and 136 provides information as to the algebraic sign of $q$, and this information is complete over any period of time except as the high pass filter 131 renders the wave 132 incomplete when $q$ falls below its band.

The waves 132 and 136 are added in a transformer 138, having a secondary winding 139. The latter is connected to drive a cathode loaded triode 140, having a cathode load 141, and biased beyond cut-off by a source 142 to a value such that waves 132 and 136, when in phase, cause anode current flow, but so that waves 132 and 136 when out of phase, or either of waves 132, 136 alone, will not cause anode current flow.

The voltage developed across cathode load 141 is applied to the cathode of triode 114, and serves to actuate the latter, if it is not already actuated by a pulse 127. If the triode 114 is conductive when triode 140 passes current, it remains conductive, and the signal 143, generated in response to the latter current, is superfluous. If the gating wave generator 24a has fallen out of step, and once either reversed or failed to reverse, when it should have, the signal 143 re-establishes correct operation.

The audio voltage 144 derivable from secondary winding 108 of transformer 107, being properly phased, corresponds in amplitude and polarity with the frequency and the algebraic sign of $q$, respectively. The wave 144 is applied to the reactance tube 32, as in the system of Figure 2, and the signal available at the output of local oscillator, mixer, I. F. amplifier 2 thereby transformed to include a strong signal at the frequency of $E_2$, which may be detected by limiter 62 and discriminator 63, to the exclusion of the signal $E_1$. Otherwise stated the signal $w+q$, originally weaker in amplitude than the signal $w$, and hence unavailable for detection by conventional methods, is now transformed into the stronger signal, and thereby made available for detection by conventional methods.

The system of Figure 6 represents, in many respects, the preferred embodiment of the invention. The principles involved in sensing the polarity of $q$ and in reversing the phase of the audio signal corresponding with the frequency of $q$, by means of a zero beat detector and a polarity correction circuit, are obviously applicable without modification, to the systems of Figures 4 and 5, since these figures illustrate modifications of the system of Figure 2, and since it is by virtue of the difference in polarity sensing circuit and gating wave generation circuits that Figures 2 and 6 differ, essentially.

Accordingly, it is to be understood that the gating wave generator control circuit 8, and the gating wave generator 24, in the systems of Figures 4 and 5, may correspond in detail with the gating wave generator circuit and the gating wave generator 24a of Figure 6, if desired.

While I have described and illustrated three specific embodiments of my invention, and have indicated a mode of arriving at a fourth such modification, it will be clear to those skilled in the pertinent art that variations of detail as well as of general arrangement of the specific circuits described and illustrated may be resorted to without departing from the true spirit and scope of the invention.

What I claim and desire to secure by Letters Patent of the United States is:

1. In combination, means for receiving two overlapping frequency modulated waves, means for developing control signals in response to only the beat frequency between said two overlapping frequency modulated waves, and means responsive to said control signals for changing the frequency of one of said two overlapping frequency modulated waves continuously to the frequency of the other.

2. In combination, means for receiving a relatively weak frequency modulated wave of frequency $w+q$ and an overlapping relatively strong frequency modulated wave of frequency $w$, said means comprising a frequency converter having a local oscillator, means for deriving a signal having an amplitude corresponding with the beat frequency $q$ between said waves, means for determining the algebraic sign of $q$, means for varying the frequency of said local oscillator in response to said signal in a sense determined by said algebraic sign and to an extent determined by the numerical value of $q$.

3. The combination in accordance with claim 2 wherein said means for deriving a signal comprises means for measuring the frequency of said beat frequency at values adjacent to $qt=0$ and $\pi$, and means for taking the algebraic sum of said frequencies at said values of $qt$.

4. In combination, means for receiving a relatively weak frequency modulated wave, means for receiving an overlapping relatively strong frequency modulated wave, means for deriving a signal having amplitude representative solely of the beat frequency between said waves, a frequency converter for said waves, said frequency converter having a local oscillator, and means for varying the frequency of said local oscillator in response to said signal in such sense and degree as to cancel one of said modulated waves in the output of said converter.

5. In combination, a source of overlapping frequency modulated signals $E_1$ and $E_2$, where $E_1$ has an instantaneous frequency $w$ and $E_2$ has an instantaneous frequency $w+q$, and where $E_1$ is stronger than $E_2$, means for sensing the algebraic sign of $q$, means for frequency detecting the envelope of $E_1+E_2$ to provide a voltage M proportional to $q$, means for determining the polarity of M in accordance with the algebraic sign of $q$, means responsive to the voltage M for adding to the frequency $w$ the frequency $q$, to generate a frequency $w+q$ at the intensity of the signal $E_1$.

References Cited in the file of this patent

UNITED STATES PATENTS

| Number | Name | Date |
|---|---|---|
| 2,075,503 | Chaffee | Mar. 30, 1937 |
| 2,371,416 | Tunick | Mar. 13, 1945 |
| 2,377,326 | Crosby | June 5, 1945 |
| 2,386,528 | Wilmotte | Oct. 9, 1945 |
| 2,388,052 | Hansell | Oct. 30, 1945 |
| 2,394,544 | Gottier | Feb. 12, 1946 |